March 29, 1938.   C. C. FARMER   2,112,417
COUPLING
Filed July 17, 1935
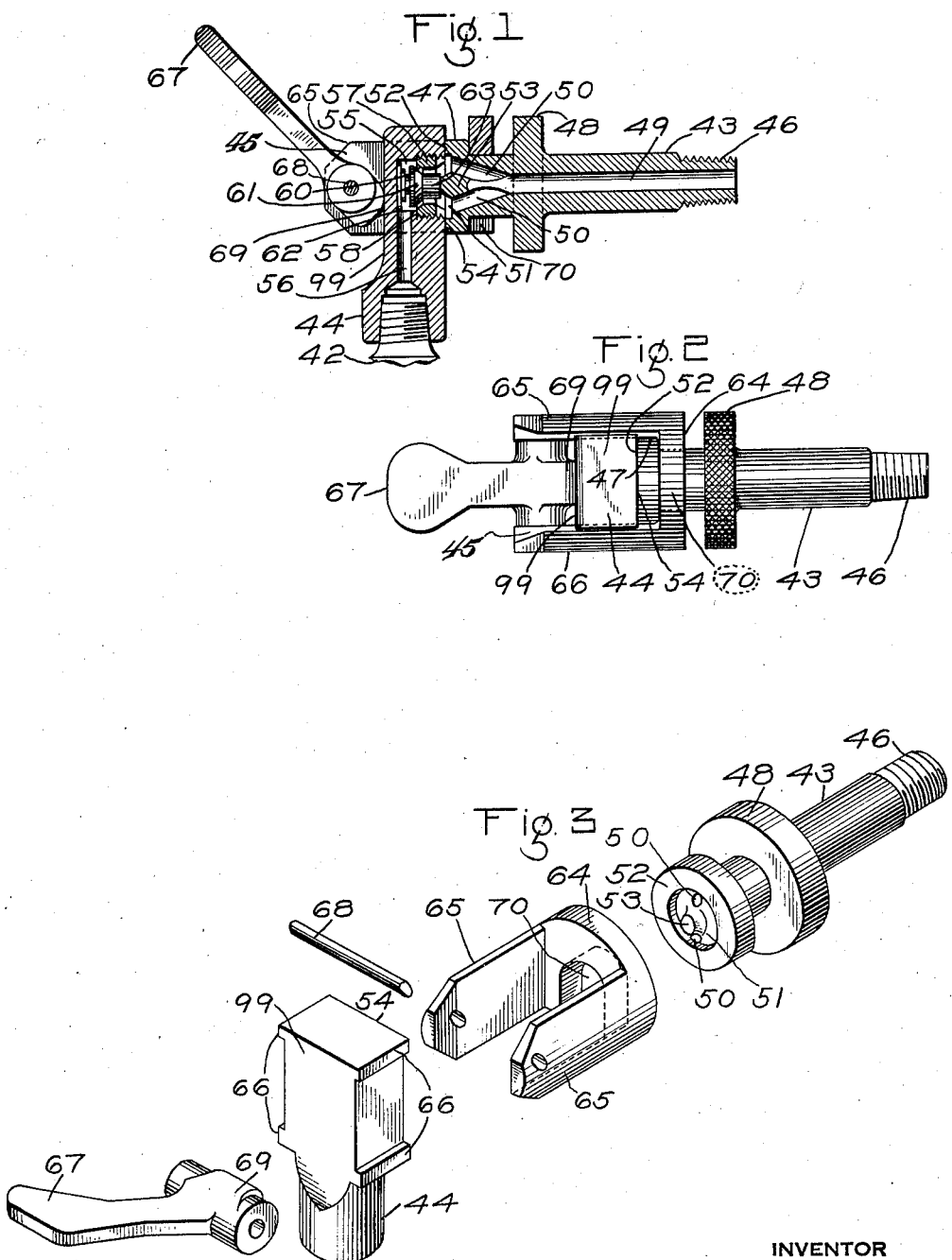
INVENTOR
CLYDE C. FARMER
BY Wm. M. Cady
ATTORNEY Patented Mar. 29, 1938

2,112,417

UNITED STATES PATENT OFFICE 2,112,417

COUPLING

Clyde C. Farmer, Pittsburgh, Pa., assignor to The Westinghouse Air Brake Company, Wilmerding, Pa., a corporation of Pennsylvania Application July 17, 1935, Serial No. 31,758

3 Claims. (Cl. 284—17)

This invention relates to couplings or connectors, and more particularly to a coupling or connector for effecting a connection between a grease gun and a device adapted to be lubricated, and the principal object of the invention is to provide an improved coupling or connector of the above type.

Other objects and advantages will be apparent from the following more detailed description of the invention.

In the accompanying drawing, Fig. 1 is a sectional view of a connector embodying the invention; Fig. 2 is a plan view of the connector shown in Fig. 1; and Fig. 3 is an exploded view of the connector shown in Fig. 1 with the elements of the connector shown isometrically.

As shown in the drawing, the improved connector or coupling comprises a nipple 43 adapted to be applied by hand to a part or device (not shown) to be lubricated, a head 44 connected to a flexible lubricant supply conduit 42 or the like and adapted to be clamped to the nipple 43, and a device 45 for effecting such clamping.

The nipple 43 is provided on one end with screw-threads 46 for attachment to the device to be lubricated and on the opposite end with a collar 47, while intermediate the ends a relatively large knurled collar 48 is provided. An axial passage 49 in the nipple extends in one direction through the screw-threaded end of said nipple and leads in the other direction to two, like, diverting branch passages 50 which lead to an annular recess 51 formed in the outer face of the collar 47. A relatively narrow annular bearing surface 52 is formed around the recess 51 on the outer face of the collar 47, while projecting centrally from said face up through the recess 51 is a stem 53 which extends slightly beyond the bearing surface 52.

The head 44 of the connector is provided with a face 54 adapted to engage and seal upon the annular bearing surface or face 52 of the nipple 43. A recess 55 is provided in the head 44 and is open at one end to face 54 and is adapted to register with the recess 51 in the nipple 43, while the other end or bottom of the recess 55 is open to a passage 56 which is connected to the flexible conduit 42.

A plug 57 is disposed in the recess 55 in screw-threaded engagement with the head 44 and engaging a shoulder 58 formed in said head. The plug 57 is provided with an axial bore which is open at one end to the face 54 and at the other end to a tapered valve seat 60. A check valve 61 is disposed in the recess 55 back of the plug 57 and is adapted to engage the seat 60, a spring 62 being provided for urging said check valve into engagement with said seat. The check valve 61 has a stem 63 of smaller diameter than and extending through the axial bore in plug 58, the length of said stem being such that when the check valve 61 is seated, the end of said stem is substantially flush with the face 54.

The clamping device 45 comprises a substantially U-shaped body, having a base portion 64 which is provided with a U-shaped slot 70 adapted to fit over the stem of the nipple 43 back of the collar 47. The body of the clamping member also has two spaced parallel legs 65 projecting from the base portion and spaced apart a distance slightly greater than the width of the head 44 so as to freely receive said head. The head 44 is provided on each of its two opposite sides with two spaced parallel shoulders or guides 66 spaced apart a distance such as to freely receive the legs 65 of the clamping member.

A handle 67 is journaled on a pin 68 which is secured in the outer portion of the legs 65, and is provided with a cam surface 69.

The clamping device 45 is adapted to be carried by the head 44, the U-shaped body of the clamping device being disposed with the legs 65 in the space between the guides 66, and the handle 65 being secured to said legs by means of the pin 68.

In use, with the nipple 43 removed from the connector head 44 and clamping device 45, screw-threaded end 46 thereof is adapted to be screwed into a bore provided in the part or device (not shown) to receive lubricant. The connector head 44 and clamping device 45 are then applied to the nipple 43.

In order to thus apply the head and clamping device, the lever 67 is first raised to a vertical position, as viewed in Fig. 1 of the drawing, and then the clamping device is mounted on the nipple with the neck of the nipple disposed within the slot 70 in the base portion of the clamp and with the inner surface of said base portion engaging the rear face of the collar 47 on the nipple. This operation automatically centralizes the connector head 44 with the nipple in such manner that the stem 53 in the nipple is in alignment with the valve stem 63 in the head. Then the lever 67 is turned from the vertical position above mentioned in a counterclockwise direction, as viewed in Fig. 1 of the drawing, thereby turning the cam 69 against the back surface 99 of the head and forcing the head into engagement with the annular bearing surface 52 on the nipple 43.

This effects a seal between the engaging surfaces 52 and 54 of the connector nipple 43 and head 44, respectively, and at the same time, the stem 53 shifts the valve 61 away from its seat whereupon lubricant supplied to conduit 42 in any suitable manner is permitted to flow past said valve into the nipple 43 and through passage 49 therein to the part to be lubricated.

After the desired amount of lubricant has been supplied through the coupling to the part being lubricated, the handle 67 is operated to relieve pressure of the cam 69 on the head 44, whereupon the spring 62 acting through the check valve 61 and stem 63 on the stem 53 urges the connector head 44 away from the end of the nipple 43 to permit prompt closing of said check valve. This operation of the handle also permits sufficient movement of the head 44 relative to the connector 43 to free the base portion of the member 45 from the nipple 43 whereupon the clamping device 45 and head are removed from the nipple 43. The nipple 43 is then adapted to be unscrewed and removed from the device which received the lubricant.

The check valve 61 is provided in the connector head 44 in order to prevent leakage of lubricant from the conduit 42 out through the connector when it is disconnected from the nipple 43 and also to prevent dirt from getting into said conduit.

From the above description it should be noted that the application and removal of the nipple 43 to and from the brake cylinder by hand is facilitated due to its symmetrical design and also due to the fact that the head 44 and the clamping device 45 carried by the head are both removed from the nipple at this time.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A removable connector adapted to be connected to a device to be lubricated for establishing a lubricant conducting communication to a passageway in said device, said connector comprising a nipple having one end for application to said device and having on the other end an annular collar, the outer face of said collar forming a bearing surface which surrounds a cavity connected to a passage adapted to lead to said passageway, means on said nipple for applying and removing said nipple to and from said device, a U-shaped clamping member having in the base a slot open at one end and adapted to fit over said collar and receive the body of said nipple, a head disposed between the legs of said clamping member and having in one face a recess adapted to register with said cavity and connected to a lubricant supply passage extending through said head, a cam mounted between the legs of said clamping member adapted to engage said head and press said face of said head into sealing engagement with said sealing surface on said nipple, and a handle for operating said cam.

2. A removable connector adapted to be connected to a device to be lubricated for establishing a lubricant conducting communication to a passageway in said device, said connector comprising a nipple having one end for application to said device and having on the other end an annular collar, the outer face of said collar forming a bearing surface which surrounds a cavity connected to a passage adapted to lead to said passageway, means on said nipple for applying and removing said nipple to and from said device, a U-shaped clamping member having in the base a slot open at one end and adapted to fit over said collar and receive the body of said nipple, a head disposed between the legs of said clamping member and having in one face a recess adapted to register with said cavity, and connected to a lubricant supply passage extending through said head, a cam mounted between the legs of said clamping member adapted to engage said head and press said face of said head into sealing engagement with said sealing surface on said nipple, a handle for operating said cam, and means for holding said head between the legs of said clamping member when said clamping member is removed from said nipple.

3. A device for establishing a lubricant conveying conduit to a device to be lubricated comprising an element adapted to be secured to said device and having a passageway open at one end to a lubricant receiving passage in said device, said element having an annular sealing surface surrounding the other end of said passage, said device further comprising a head having an annular sealing face surrounding a lubricant supply passage and adapted to engage and seal against said annular sealing surface for establishing communication from said supply passage to said passageway, said element having an annular collar formed thereon to the rear of and in a plane parallel to said sealing surface, a U-shaped member comprising a slotted base adapted to fit over said element and engage the rear face of said collar, the slot in said base being open at one end to permit removal of said member from said element, said head having two parallel slots, one at either side of said sealing face, arranged at right angles to the plane including said sealing face, said U-shaped member further comprising two spaced legs projecting from said base and slidably mounted in said slots, and a cam pivotally carried in the end of said legs adapted, when the base of said U-shaped member is in engagement with said collar, to engage said head on a surface opposite said sealing face for pressing said sealing face into sealing contact with said sealing surface.

CLYDE C. FARMER.